(12) United States Patent
Jinzaki

(10) Patent No.: US 6,839,703 B2
(45) Date of Patent: Jan. 4, 2005

(54) INFORMATION APPARATUS, TABLE RETRIEVAL APPARATUS, TABLE RETRIEVAL METHOD, AND RECORDING MEDIUM

(75) Inventor: Akira Jinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 337 days.

(21) Appl. No.: 09/783,559

(22) Filed: Feb. 15, 2001

(65) Prior Publication Data

US 2001/0042070 A1 Nov. 15, 2001

(30) Foreign Application Priority Data

May 15, 2000 (JP) ........................................ 2000-142102

(51) Int. Cl.$^7$ .............................................. G06F 17/30
(52) U.S. Cl. ..................... 707/3; 707/2; 707/9; 707/10; 707/101; 370/401
(58) Field of Search ................................ 707/1, 2, 3, 5, 707/7, 9, 10, 101; 370/395, 40; 711/173; 709/243, 250, 236

(56) References Cited

U.S. PATENT DOCUMENTS

| | | | | | |
|---|---|---|---|---|---|
| 4,918,646 | A | * | 4/1990 | Hirose ........................... | 707/3 |
| 5,129,074 | A | * | 7/1992 | Kikuchi et al. .............. | 711/173 |
| 6,011,795 | A | | 1/2000 | Varghese et al. | |
| 6,515,998 | B1 | * | 2/2003 | Yamashita et al. .......... | 370/401 |

FOREIGN PATENT DOCUMENTS

| | | |
|---|---|---|
| JP | 9-107377 | 4/1997 |
| JP | 10-177582 | 6/1998 |
| JP | 10-222535 | 8/1998 |
| JP | 11-088427 | 3/1999 |
| JP | 11-103318 | 4/1999 |
| JP | 11-261647 | 9/1999 |
| JP | 11-284658 | 10/1999 |
| JP | 2000-22736 | 1/2000 |
| WO | 99/13619 | 3/1999 |

OTHER PUBLICATIONS

Pankaj Gupta et al., "Routing Lookups in Hardware at Memory Access Speeds", INFOCOM '98, Mar. 1998, pp. 1240–1247.
V. Srinivasan et al., "Fast Address Lookups Using Controlled Prefix Expansion", ACM Transactions on Computer Systems, vol. 17, No. 1, Feb. 1999, pp. 1–40.
M. Zitterbart et al., "Efficient Routing Table Lookup for IPv6", IEEE Workshop HPCS 1997, Jun. 23, 1997, pp. 1–9.
Geng–Sheng Kuo et al., "A New Architectural Concept of Hierarchical Routing Scheme for IPv6 in Future High–Speed Large Global Internet", ITS '98 Proceedings, Aug. 1998, pp. 638–643.

(List continued on next page.)

Primary Examiner—Alford W. Kindred
Assistant Examiner—Fred Ehichioya
(74) Attorney, Agent, or Firm—Staas & Halsey LLP

(57) ABSTRACT

A retrieval key to be used for the retrieval of a table is divided into a plurality of divided retrieval keys consisted of a plurality of bit strings. Each divided retrieval key is provided with a corresponding retrieval table. Further, the size of the table to be retrieved by one divided retrieval key is made to be smaller than the size of a table to be retrieved one time by a whole retrieval key. First, the first retrieval table is retrieved by the divided retrieval key (A bits). If the result is obtained, the result is outputted unchanged. If the pointer to the second retrieval table is obtained, the second retrieval table is retrieved by the other divided retrieval key (B bits). In this way, a retrieval process continues using the divided retrieval keys.

27 Claims, 18 Drawing Sheets

OTHER PUBLICATIONS

"Tiny Tera/High Performance Switching." http://klamath.stanford.edu/tiny-tera/abstract/index.htm.

"Tiny Tera/Papers." http://klamath.stanford.edu/tiny-tera/papers/index.htm.

"Tiny Tera/People." http://klamath.stanford.edu/tiny-tera/people/index.htm.

"Tiny Tera/Talks." http://klamath.stanford.edu/tiny-tera/talks/index.htm.

"Tiny Tera/Java Animations" http://klamath.stanford.edu/tiny-tera/demos/index.htm.

Ken K.—Y. Chang, et al, "A 2 Gb/s Asymmetric Serial Link for High Bandwidth Packet Switches." *Computer System Laboratory*. Stanford University.

Nick McKeown, et al, "The Tiny Tera: A Packet Switch Core." Department of Electrical Engineering and Computer Science. Stanford University.

Kun-Yung Ken Chang, et al, "A 2Gb/s/pin CMOS Asymmetric Serial Link." Computer System Laboratory. Stanford University.

Nick McKeown, et al, "A Quantitative Comparison of Scheduling Algorithms for Input-Queued Switches".

Balaji Prabhakar, et al, "Multicast Scheduling For Input-Queued Switches."

Nick McKeown, et al. "High Performance Switching" Last Modified: Nov. 30, 1995.

Yoichi Hariguchi, "Review of Recent Route Search Technology, Route Search via Revised Binary Trees/B-Trees" from the article "NETWORK TECHNOLOGY, 11" in *Unix Magazine*. Oct. 1998.

Yoichi Hariguchi, "Review of Recent Route Search Technology(2), Route Search via Two-way Lookup Tables" from the article "NETWORK TECHNOLOGY, 12" in *Unix Magazine*. Nov. 1998.

Stefanos Sidiropoulos, et al, "Current Integrating Receivers for High Speed System Interconnects." Center for Integrated Systems, Stanford University.

"Tiny Tera/People." http://klamath.stanford.edu/tiny-tera/talks/index.htm.

"Tiny Tera/Java Animation" http://klamath.stanford.edu/tiny-tera/demos/index.htm.

* cited by examiner

| 0.0.0.0 | PATH TO 0.0.0.0 |
| --- | --- |
| 10.0.0.0 | PATH TO 10.0.0.0 |
| 10.0.1.0 | PATH TO 10.0.1.0 |
| 10.0.1.128 | PATH TO 10.0.1.128 |
| 10.1.0.0 | PATH TO 10.1.0.0 |

FIG. 1   PRIOR ART

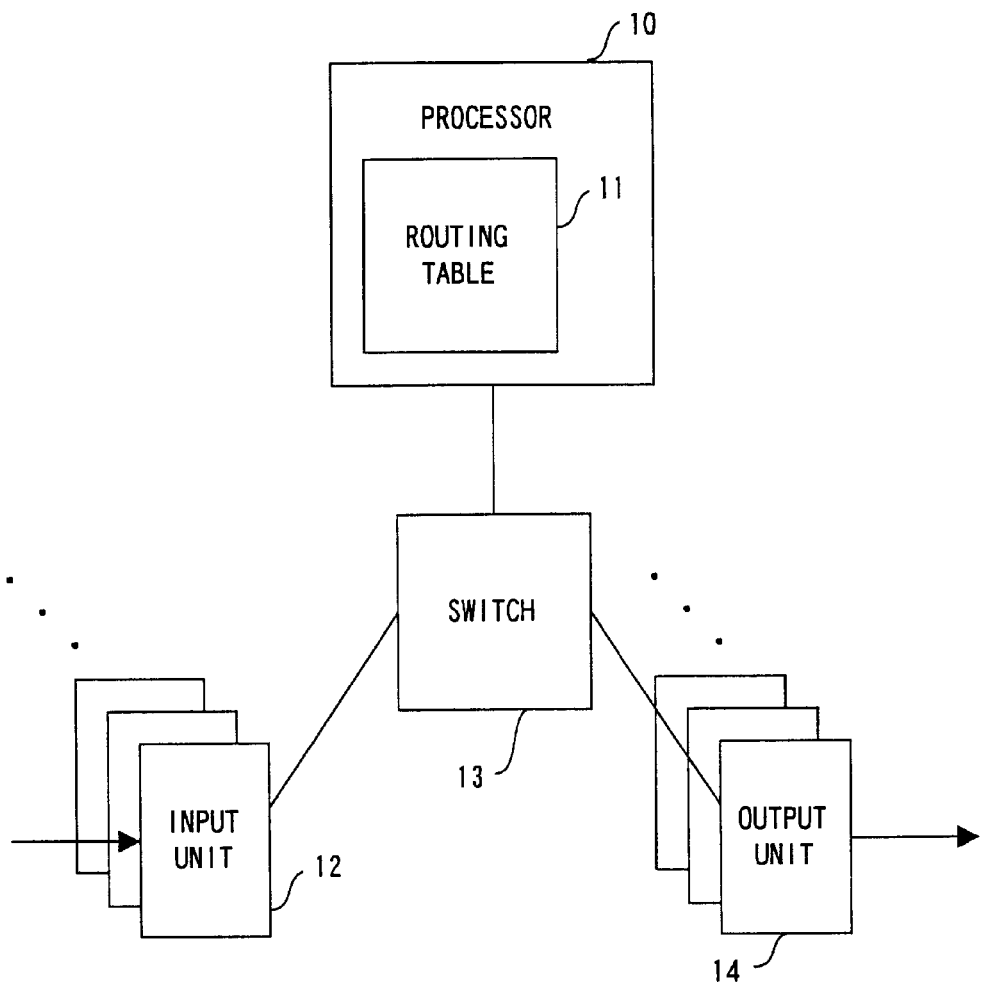
F I G. 5

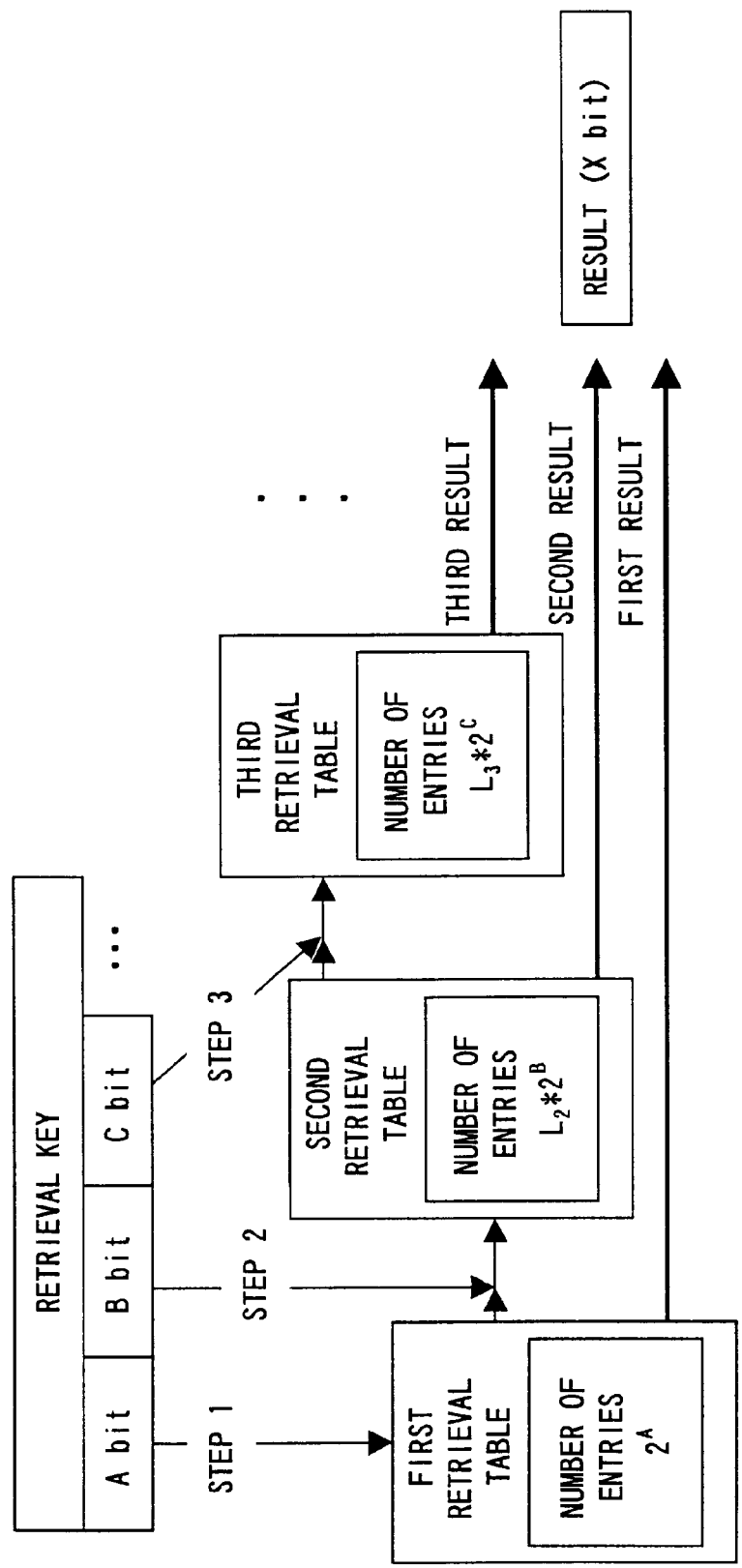
F I G. 6

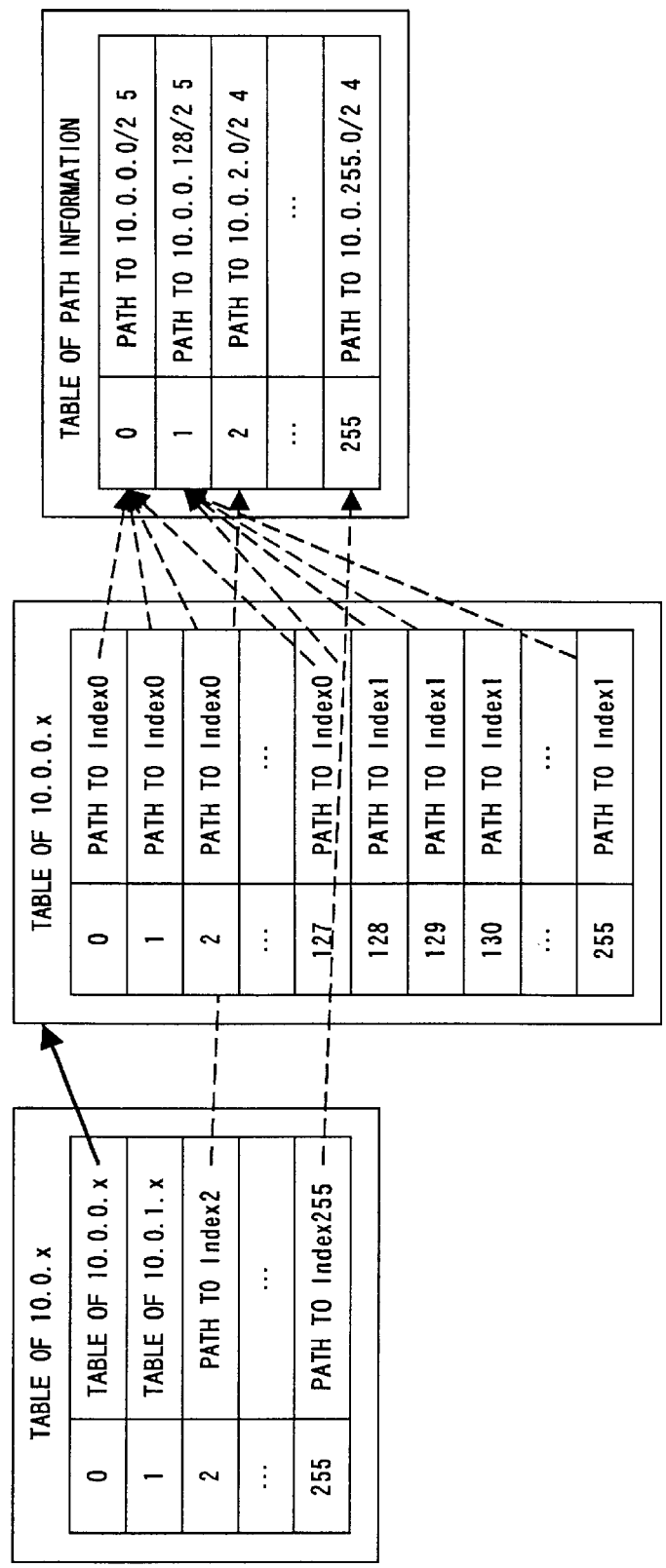
F I G. 11

FIG. 13

TABLE OF 10.0.0.x

| | |
|---|---|
| 0 | TABLE OF 10.0.0.x |
| 1 | TABLE OF 10.0.1.x |
| 2 | PATH TO 10.0.2.0/2 4 |
| ... | ... |
| 255 | PATH TO 10.0.255.0/2 4 |

TABLE OF 10.0.0.x

| | |
|---|---|
| 0 | TABLE OF 10.0.0.0/2 5 |
| 1 | RELATIVE Index-1 IN A TABLE |
| 2 | RELATIVE Index-2 IN A TABLE |
| ... | ... |
| 127 | RELATIVE Index-127 IN A TABLE |
| 128 | PATH TO 10.0.0.128/2 5 |
| 129 | RELATIVE Index-1 IN A TABLE |
| 130 | RELATIVE Index-2 IN A TABLE |
| ... | ... |
| 255 | RELATIVE Index-127 IN A TABLE |

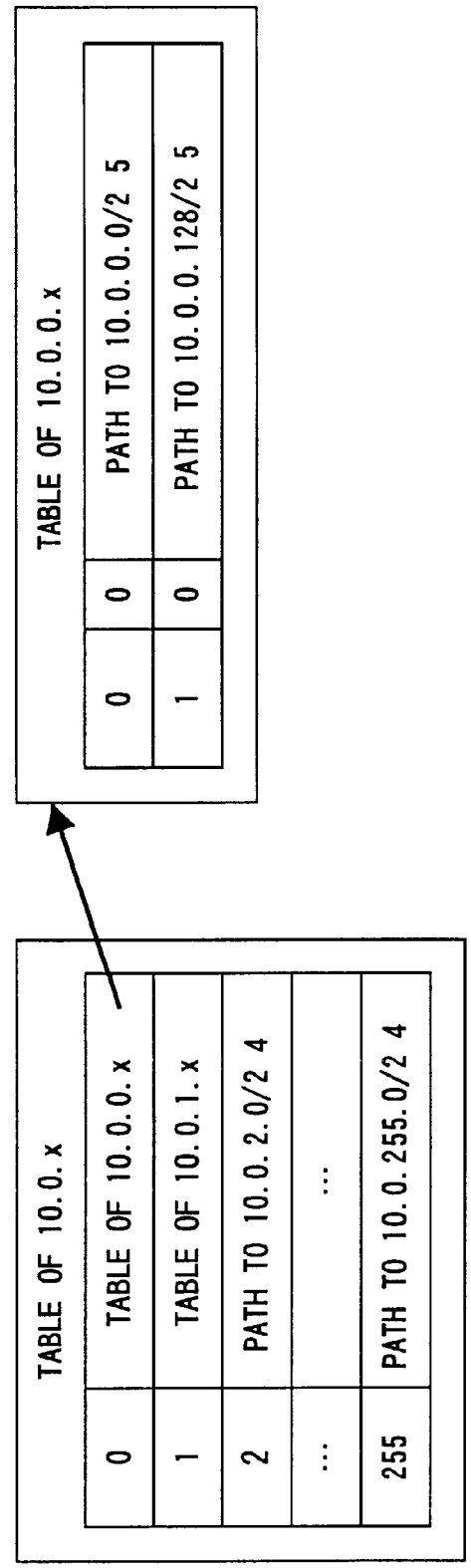
F I G. 14

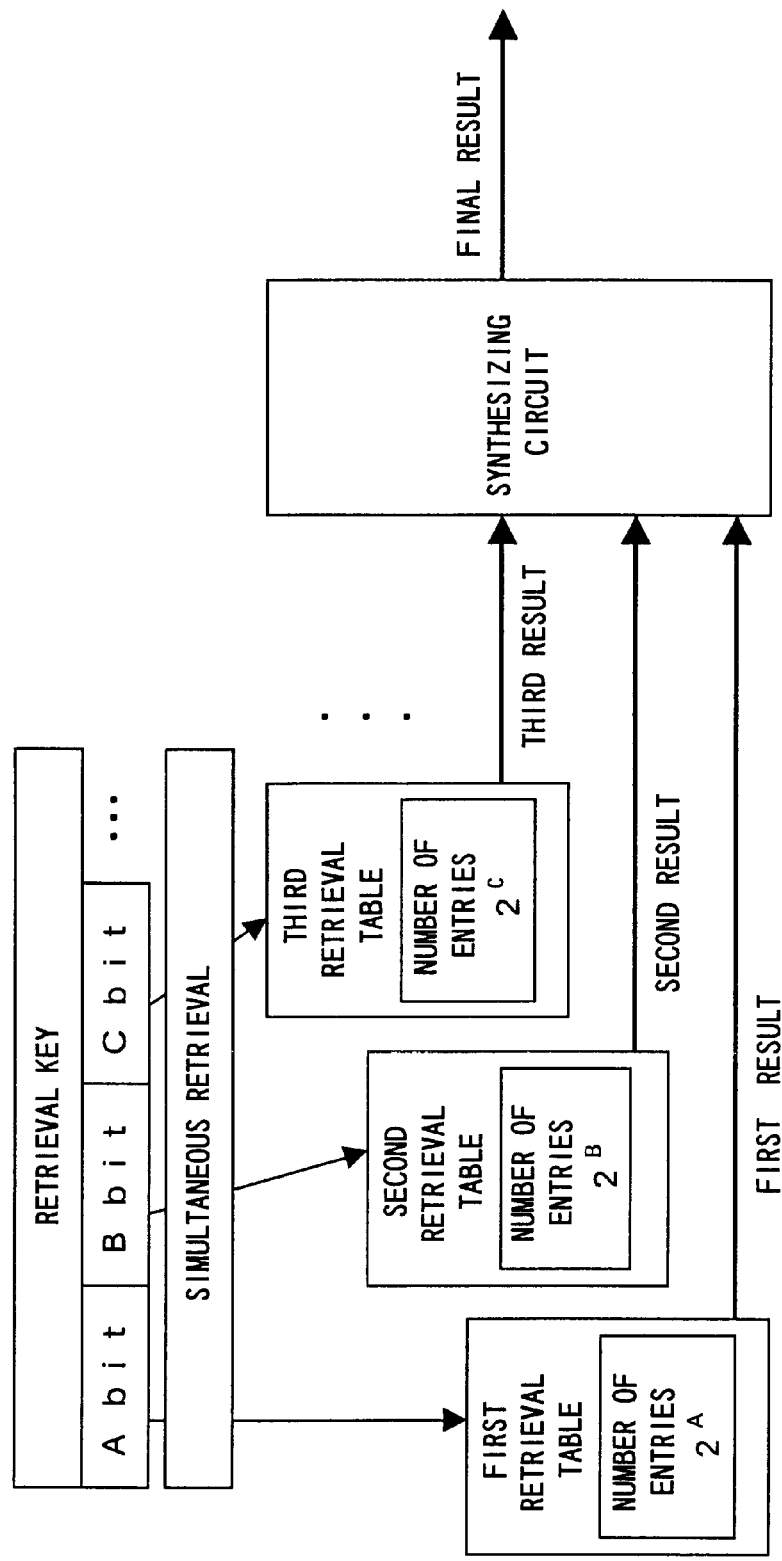
F I G. 17

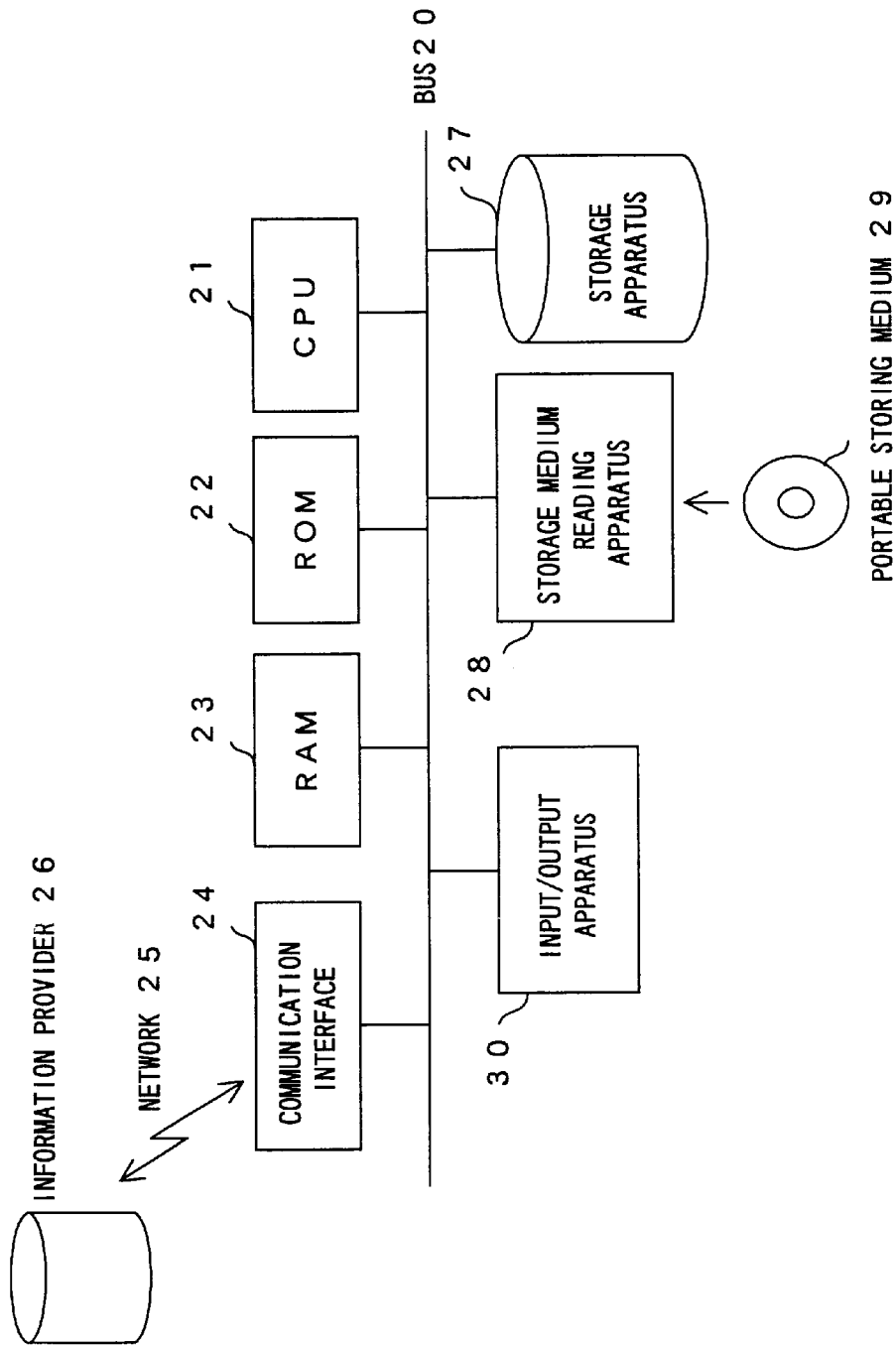
F I G. 18

INFORMATION APPARATUS, TABLE RETRIEVAL APPARATUS, TABLE RETRIEVAL METHOD, AND RECORDING MEDIUM

BACKGROUND OF THE INVENTION

1. Field of the Invention

The present invention relates to the data structure of a high-speed retrievable table, especially to an information apparatus with a table that can realize the longest prefix match search at high speed and that can also perform processes at high speed such as the retrieval and preparation of a table, or the addition, modification, and deletion of table items.

2. Description of the Related Art

A process of storing a plurality of pieces of data in the array (table) that has a specific structure, and retrieving data that matches particular data is used in many areas in an information process. Among the areas, for example, the longest prefix match search is used for the longest prefix match search of a dictionary or for the retrieval of a path table that is used for a routing process in the Internet protocol, and accordingly the search is important.

The representative application example that requires the longest prefix match search is the path table retrieval that is used for the Internet protocol, etc.

The following explanation is of a case of the path table retrieval. The longest prefix match search, however, can be used for various types of usage including a database retrieval, etc., and accordingly it is not limited to the path table retrieval.

In the following explanation, furthermore, a network address of 32 bits of IPv4 is divided into, for example, "aaa. bbb. ccc. ddd" for each 8 bits, and each 8-bit value is expressed with decimal notation. For example, "10.0.0.1" is "0x0A000001" if expressed in hexadecimal notation. Also, the length of a network unit is explicitly expressed as, for example, "10.0.0.0/24". This indicates that the network unit of 10.0.0.0 is 24 bits (10.0.0) from the top. These notations are generally accepted. In the following explanation, a value for which specific designation is not required (don't care), is indicated by an "x" such in, for example, "10.0.0.x".

A path table is a database arranging network address and path information to reach a network address in a pair. When an Internet router receives a packet from the network, it retrieves a path table setting the destination address of this packet as retrieval data, detects the longest matching network address, and transfers the packet toward the path of the network address. Here, the path is the next link forwarding the packet.

FIG. 1 shows one example of a path table.

For example, assume that a network address and path like FIG. 1 are registered in the path table.

In this example, when "10.0.1.2" is given as retrieval data (destination of packet), "10.0.1.0" is matched. This is because "10.0.1.0" is matched as being one bit longer than "10.0.1.128", taking a bit unit into consideration. In the case that the entry of "10.0.1.0" is not present in a path table, "10.0.1.128" becomes the longest prefix match. If "10.0.1.128" is not present, "10.0.0.0" becomes the longest prefix match; if "10.0.0.0" is not present, "10.1.0.0" becomes the longest prefix match; and if "10.1.0.0" is not present, "0.0.0.0" becomes the longest prefix match. In the case that "0.0.0.0" becomes the longest prefix match, the upper 4 bits match with "0".

Furthermore, there is a concept called a default route in a routing process. Even in the case that there is not a matching path in retrieval data, a used path can be defined, so that the retrieval process of a path table can be successful and does not fail.

The object when attempting the longest prefix match search is to minimize the processes of retrieving a table, adding a table, modifying a table, deleting a table, etc., and to perform these processes at high speed. As for conventional technologies, there are many methods such as a method devising retrieval algorithm (articles 1~6), a method using a hardware CAM (Contents Addressable Memory) (articles 1~8), and a new method (articles 9 and 10). Most of these methods aim at a path table retrieval. However, the longest prefix match search of these methods remains at the same level as a word retrieval.

The retrieval of a path table is originally realized by software. Fundamentally, a retrieval method using Binary Tree and also Radix Tree has been used. However, a packet is transmitted at a speed of hundreds of thousands of packets/second in a high-speed network. Therefore, software cannot cope with such high-speed transmission. In the case that a path table is retrieved in a time less than a microsecond, a hardware retrieval method is used. In hardware retrieval, generally, a path table is controlled by software, and hardware is optimized so as to process retrieval at high speed. The Tiny Tera method (article 11) developed by Stanford University is a representative example of such a retrieval method.

FIG. 2 is a diagram explaining the Tiny Tera method.

The Tiny Tera method performs a path table retrieval process as follows:

A retrieval key is divided into two fields.

When a length of the retrieval key is K, the first field is P, and the second field is K-P.

In the case of IPv4 (Internet Protocol version 4: K=32), P=24.

A table (first retrieval table) for looking up the first field as an index is provided.

A pointer to path information or the second retrieval table is stored in the first retrieval table.

The second retrieval table prepares the required number of tables of $2^{k-P}$ entries.

The first retrieval table is retrieved by the first field (Step 1).

If path information is obtained, it becomes the result (the first result).

If a pointer to the second retrieval table is obtained, the second retrieval table is retrieved by this pointer and the second field (step 2).

In this way, the retrieval process terminates with two accesses at most in the Tiny Tera method.

In the Tiny Tera method, a path retrieval of the IPv4 address terminates by accessing a table twice at most. As it is clear from the method, the retrieval process can be easily performed by hardware. In this case, it is possible to make the retrieval time equal to or less than 100 ns. However, there are the following problems:

As the first retrieval table, a memory for $2^{24}$ (approx. 16,000,000 bytes) entries is required.

The number of paths that are used in the present Internet is 100,000 at maximum, and accordingly the first retrieval table becomes thin since only $\frac{1}{160}$ of the table is used (in other words, the memory is not fully used).

Since a table of 16 M words generally does not enter into a cache memory, cache errors frequently occur. Accordingly, a path table needs to be accessed each time there is a cache error, resulting in deterioration of the processing speed.

In the Tiny Tera method, basically, a network path is developed to a host path. Therefore, for example, when a network of which the network address is 8 bits, is registered in the first retrieval table, $2^{16}$ (about 65,000) entries are required to be developed into a table and the same path information is provided with all these entries. In other words, only 8 bits are used for the value responded by 24 bits that is a retrieval key of the first retrieval table. Therefore, path information is registered for all the values that the remaining 16 bits can assume.

A time proportional to the number of entries is required at the time of preparation, modification, deletion of a path table.

Since all the entries cannot be modified at one time, an inconsistent data condition occurs during modification. Therefore, there is the possibility that the inconsistent data is obtained in the longest prefix match search that is carried out at this time.

The method cannot cope with a network protocol that has a long address such as IPv6 (Internet Protocol version 6). In other words, the number of entries to be registered greatly increases when a network address becomes long. Accordingly, the above-mentioned problem becomes more serious.

FIG. 3 is a drawing showing the concept of the routing process of a router.

A router R needs to transfer packets to networks N1 to N4 connected to the router R. At this time, a destination address of the packet that is input to the router R is checked, and it is determined to which path the packet is transmitted. At this time, generally, a plurality of different networks N1 to N4 are connected to the router R. In this case, different paths are not allocated to all the networks. As shown in FIG. 3, for example, a packet is often transmitted to the networks N1 and N4 using the same path 11 connected to one port of the router R. In such a case, since all the packets of which the addresses are the networks N1 and N4, are output to the path 11, 11 is registered in the path table as an output path of both the network addresses N1 and N4.

FIG. 4 shows the concept of a path table of the Tiny Tera method.

In the case of FIG. 4, the network address N1 is made shorter than 24 bits. In this case, entries are formed for all the bit values that are added behind the network, among 24 bits. 11 is registered as an output path for all the paths. If it is assumed that the network address N4 is longer than 24 bits and consists of bit values V4 and W4, the first path table is first retrieved by the bit value V4 of 24 bits in a table (1) of FIG. 4. Then, since a pointer to the second route table is acquired, based on this pointer, a path table (2) of FIG. 4 is retrieved by the bit value W4. Thus, 14 is acquired as an output path. Further, if it is assumed that a network address N3 consists of just 24 bits, 13 is acquired as an output path since there is only one entry of the network address N3.

The path table does not perform a comparing/matching process of a network address obtained by a network address storage unit and a network address obtained by a packet, but the path table is directly referred to while setting the network address obtained by a packet as an offset. Therefore, for all the values that the network address can assume, a memory area must be provided even if such an address is not present. Accordingly, even if the register number of network addresses registered in the path table is less than $2^{24}$, the first path table requires a memory capacity of $2^{24}$ entries. In other words, there is the problem that a memory area that is not used is present, and many memory capacities are rapidly required when the number of bits of a key for retrieving the path table increases as the number of bits of the network address increases.

SUMMARY OF THE INVENTION

The object of the present invention is to provide the data structure of a high-speed retrievable table with a small amount of memory and without an entry that is not used.

The data structure of a table is the one for storing data corresponding to a retrieval key. The data structure of a table is provided with a plurality of divided tables obtained by dividing the table into tables corresponding to a plurality of divided retrieval keys obtained by dividing a retrieval key into 3 or more optional N keys. Each divided table stores data corresponding to each divided retrieval key, or a pointer or an index that indicates data or another divided table.

A table retrieval apparatus is the one for retrieving a table and acquiring a required result. The apparatus includes an input device inputting divided retrieval keys obtained by dividing a retrieval key into three or more optional number keys. The table is divided into tables corresponding to the divided retrieval keys. Further, the apparatus includes a divided table storage device storing a divided table for storing a pointer or an index that corresponds to the divided retrieval key and indicates data or another divided table. Still further, the apparatus includes a result acquisition device acquiring a final result by retrieving each divided table using the divided retrieval key.

The table retrieval method is the one acquiring a desired result by retrieving a table. The method comprising the following steps:
(a) Inputting divided retrieval keys that are obtained by dividing a retrieval key into 3 or more optional number keys;
(b) Storing divided tables which are obtained by dividing the table corresponding to the divided retrieval keys, each key of which stores a pointer or an index that corresponds to the divided retrieval key and indicates data or another divided table; and
(c) Acquiring a final result by retrieving each divided table using the divided retrieval key.

According to the present invention, divided tables that are divided corresponding to the divided retrieval keys, are stored. Therefore, the table becomes small, so that a memory capacity required for the storage also can be small. Further, the number of areas that is not used in the divided table can be decreased by properly adjusting the size of the divided retrieval key, thereby economizing a memory capacity.

Since the divided table is small, the retrieval speed of the table becomes fast at the time of the retrieval.

BRIEF DESCRIPTION OF THE DRAWINGS

FIG. 1 is a table showing one example of a path table;

FIG. 5 is a drawing showing a fundamental configuration of the router;

FIG. 6 is a drawing explaining the first embodiment of the present invention;

FIG. 11 shows tables explaining one method for solving the problem that is explained in FIG. 10;

FIG. 13 shows tables explaining still another method for solving the problem that is explained in FIG. 10;

FIG. 14 shows tables indicating another configuration example of the data structure of the table in the embodiment of the present invention;

FIG. 17 is a drawing explaining the second embodiment of the present invention; and FIG. 18 is a drawing showing one example of the hardware environment of an apparatus required by a program to realize a retrieval process using the table described in the embodiments of the present invention.

DESCRIPTION OF THE PREFERRED EMBODIMENTS

Figure 2:
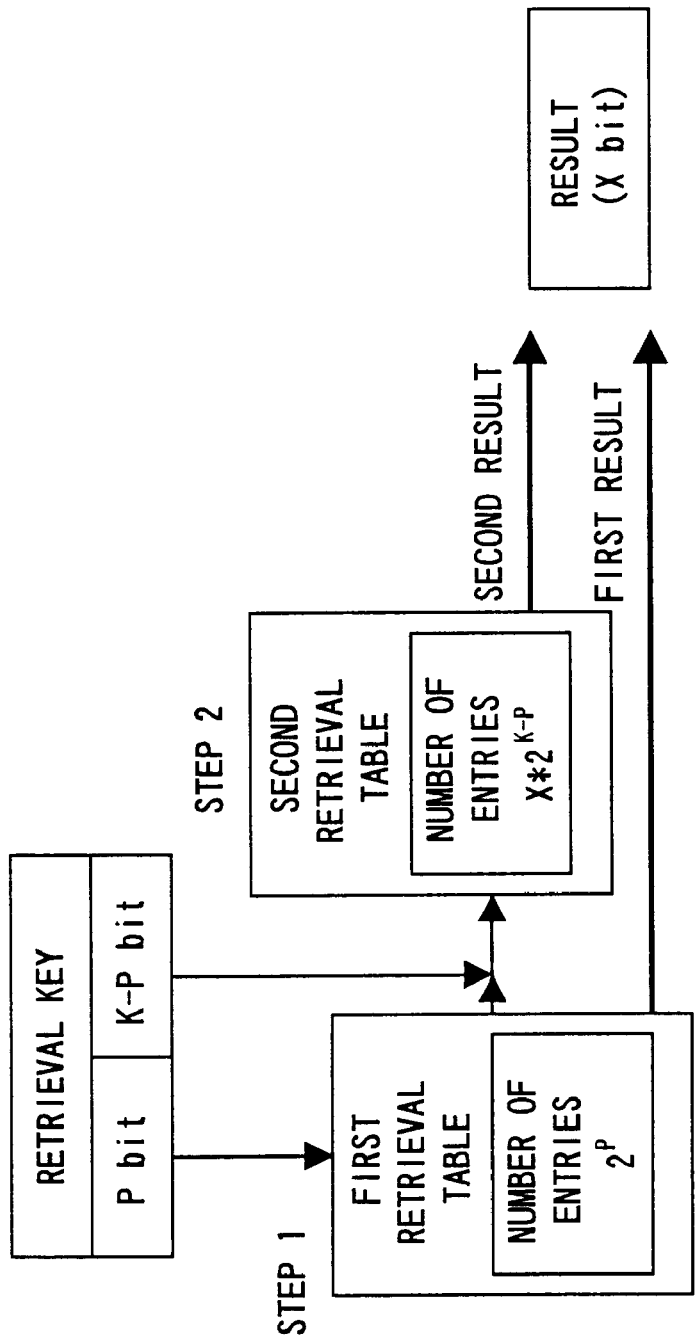
FIG. 2 is a drawing explaining the Tiny Tera method.
Figure 3:
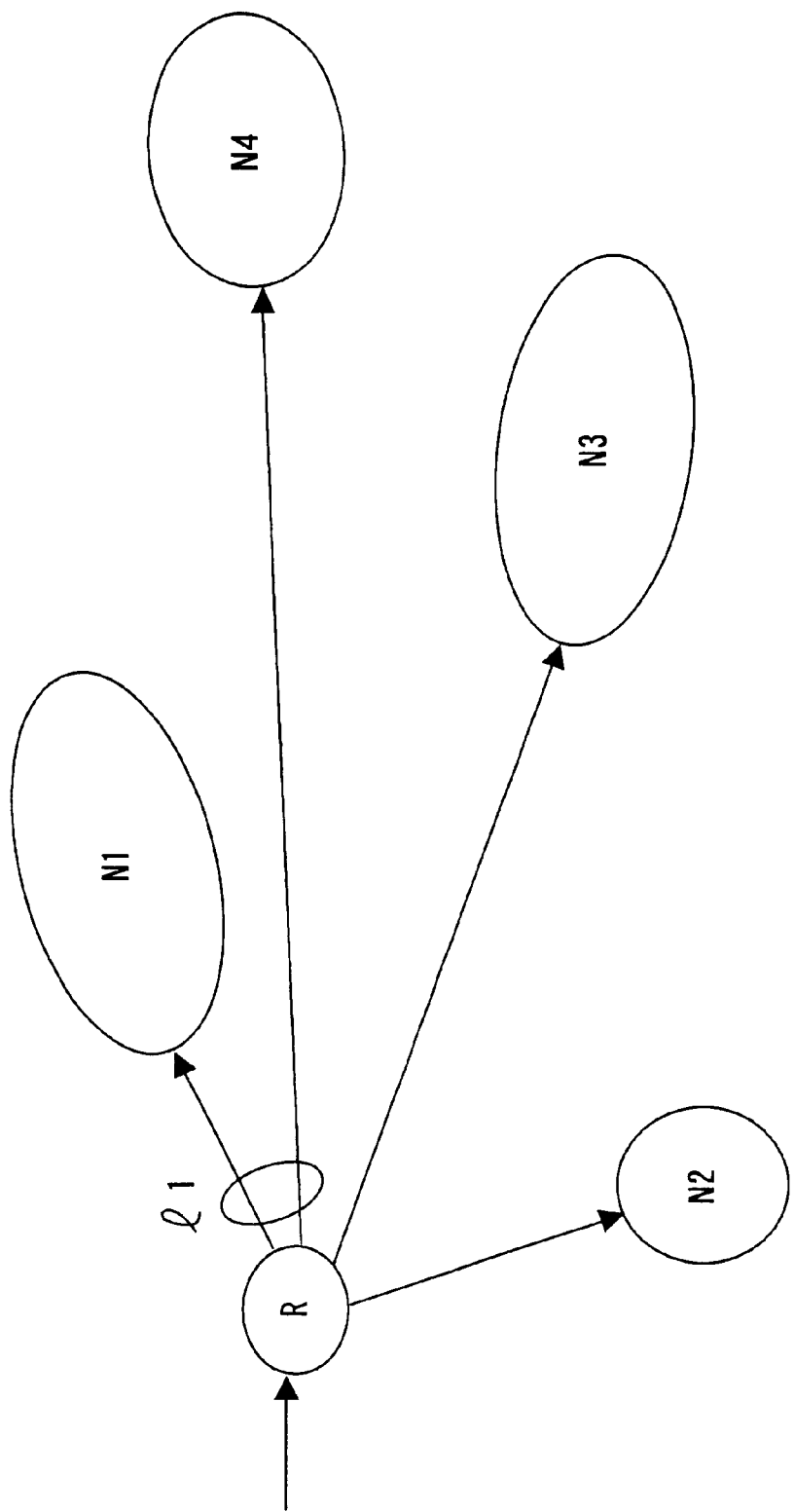
FIG. 3 is a drawing showing the concept of the routing process of a router.
Figure 4:
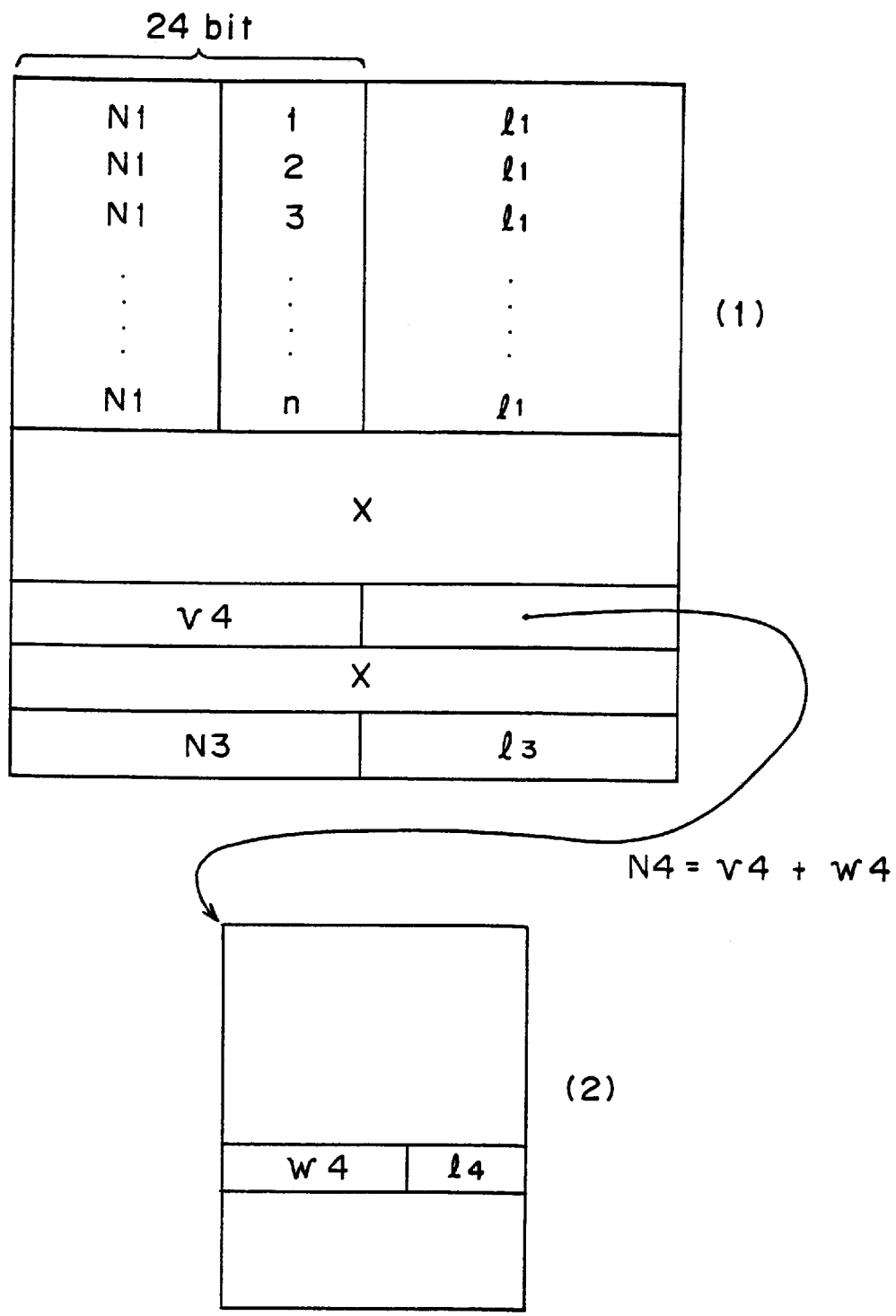
FIG. 4 is a table showing the concept of the path table in the Tiny Tera method.

The basic configuration of a router is explained on the premise of a path table. However, the present invention is not limited to the application of a path table.

FIG. 5 is a drawing showing the fundamental configuration of a router.

The router consists of a processor 10 having a routing table 11, input unit 12 receiving an input packet, switch 13 that is controlled by the processor 10 and switches the input packet to an appropriate path, and output unit 14 outputting the packet that is transmitted from the switch 13 to a network.

The processor 10 communicates with other routers, properly updates the routing table 11, and realizes an optimum routing process. At this time, the processor 10 is required to retrieve and update the routing table 11 at high speed. In the present embodiments, the data structure of a table with a small memory capacity, which is suitable for the routing table 11 and enables a high-speed process of the router, is provided.

FIG. 6 is a drawing explaining the first embodiment of the present invention.

In the present embodiment, a retrieval key (destination address of a packet in the case of the path table of a router in the Internet) is divided into 3 or more fields, and a table is provided with each field. When the field is divided, each field may be divided by the same length (A=B=C=...), or may be divided by a different length if necessary (A≠B≠C≠C≠). This divided field is called a divided retrieval key in the present specification.

In the present embodiments, the first retrieval table is retrieved by using A bits of the retrieval key in step 1. The number of entries of the first retrieval table is $2^A$. In the case that the data of an output path is obtained after the first retrieval table is retrieved, the retrieval process terminates, and the first result is output as the retrieval result.

In the case that a pointer to the second retrieval table is obtained after the first retrieval table is retrieved, the second retrieval table is retrieved using a B-bit value of the retrieval key. The number of entries of the second retrieval table is $L_2 \cdot 2^B$, corresponding to the fact that the retrieval key has B bits. Here, $L_2$ is the number of retrieval tables indicated by the pointer from the first retrieval table, and the number can be any number depending on the network configuration. In the case that the second retrieval table is retrieved by the pointer from the first retrieval table, it is sufficient to check only the table that is indicated by the pointer. Therefore, only one table of $L_2$ tables is retrieved. In the case that the data of an output path is obtained after the second retrieval table is retrieved, the second result is output as the final retrieval result.

In the case that a pointer to the third retrieval table is obtained after the second retrieval table is retrieved, the third retrieval table is retrieved using a C-bit value of the retrieval key. The number of all the entries of the third retrieval table is $L_3 \cdot 2^C$. Here, as with $L_2$, $L_3$ is the number of tables in the third retrieval table that is indicated by the pointer of the second retrieval table. In the case that the data about an output path is obtained after the third retrieval table is retrieved, the third result is output as a final result.

In the present embodiments, a required retrieval result is obtained using 3 or more divided retrieval keys, by sequentially retrieving the retrieval tables corresponding to the divided retrieval keys. In this way, since the divided retrieval key has a small number of bits, the number of entries of the corresponding retrieval table becomes small, thereby avoiding inefficient use of the memory. Further, the number of entries of each retrieval table becomes small, which enables the updating of data at high speed.

Figure 7:
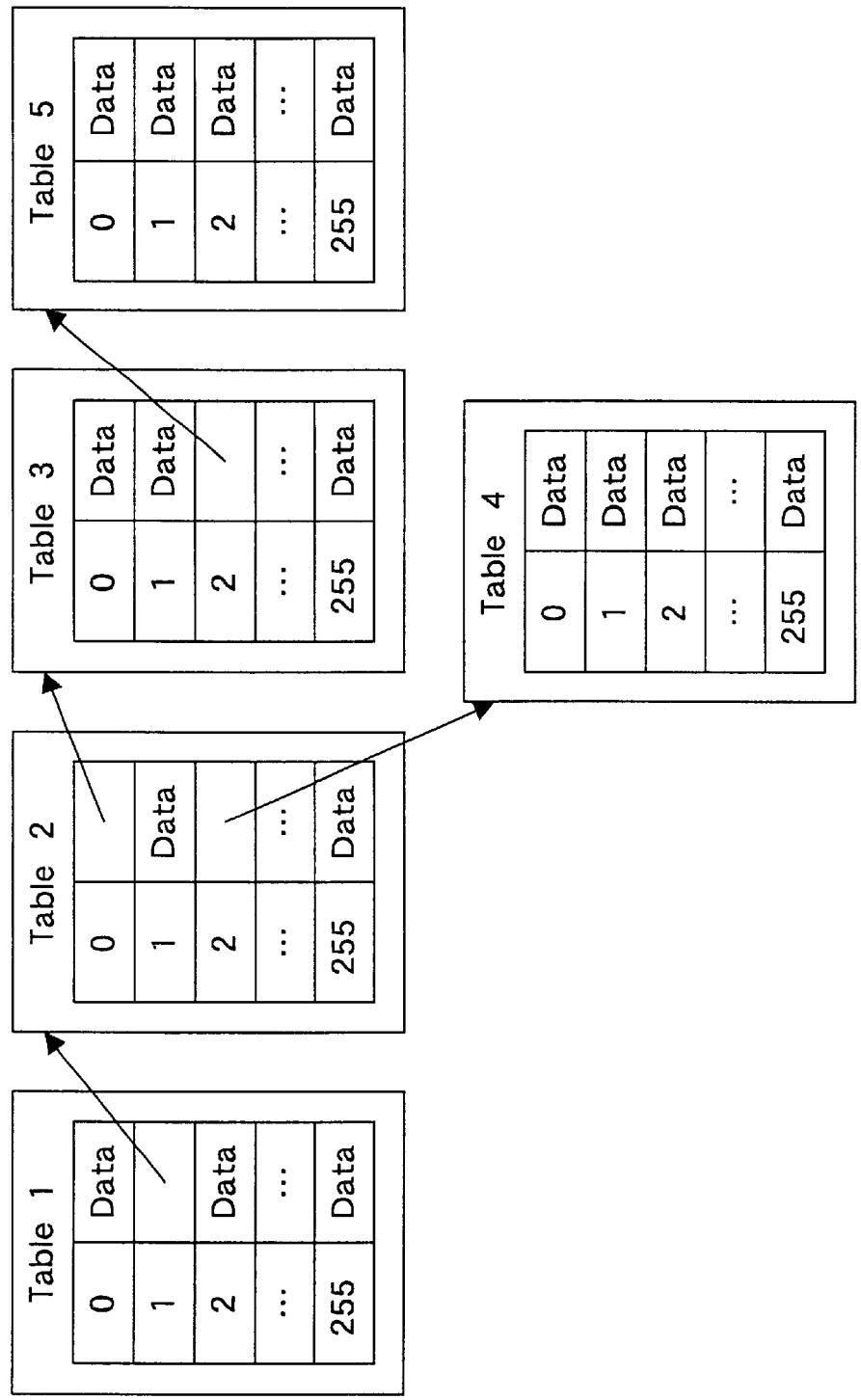
FIG. 7 shows an example of the structure of logical tables in the case that a retrieval key of 4 bytes (32 bits) is divided into a key of 1 byte (8 bits)

FIG. 7 is a drawing showing one example of the structure of a logical table in the case that a retrieval key of 4 bytes (32 bits) is divided every 1 byte (8 bits)

In the example of FIG. 7, one table consists of 256 ($=2^8$) entries. Each entry of the table is configured by data that is a final retrieval result (path information in the case of a path table), or the identification number or the address in a memory (pointer) that indicates another table. In a conventional method, the key data and mask data to be retrieved are stored in the table, and a retrieval process is performed by comparing retrieval data and these pieces of data. In the present embodiments, however, the table is referred to while setting the retrieval key as the offset value in a memory. Therefore, neither a comparative function nor data for the comparison is required. In the explanation of the present embodiments, a value is represented on the table in order to clarify the explanation.

Figure 8:
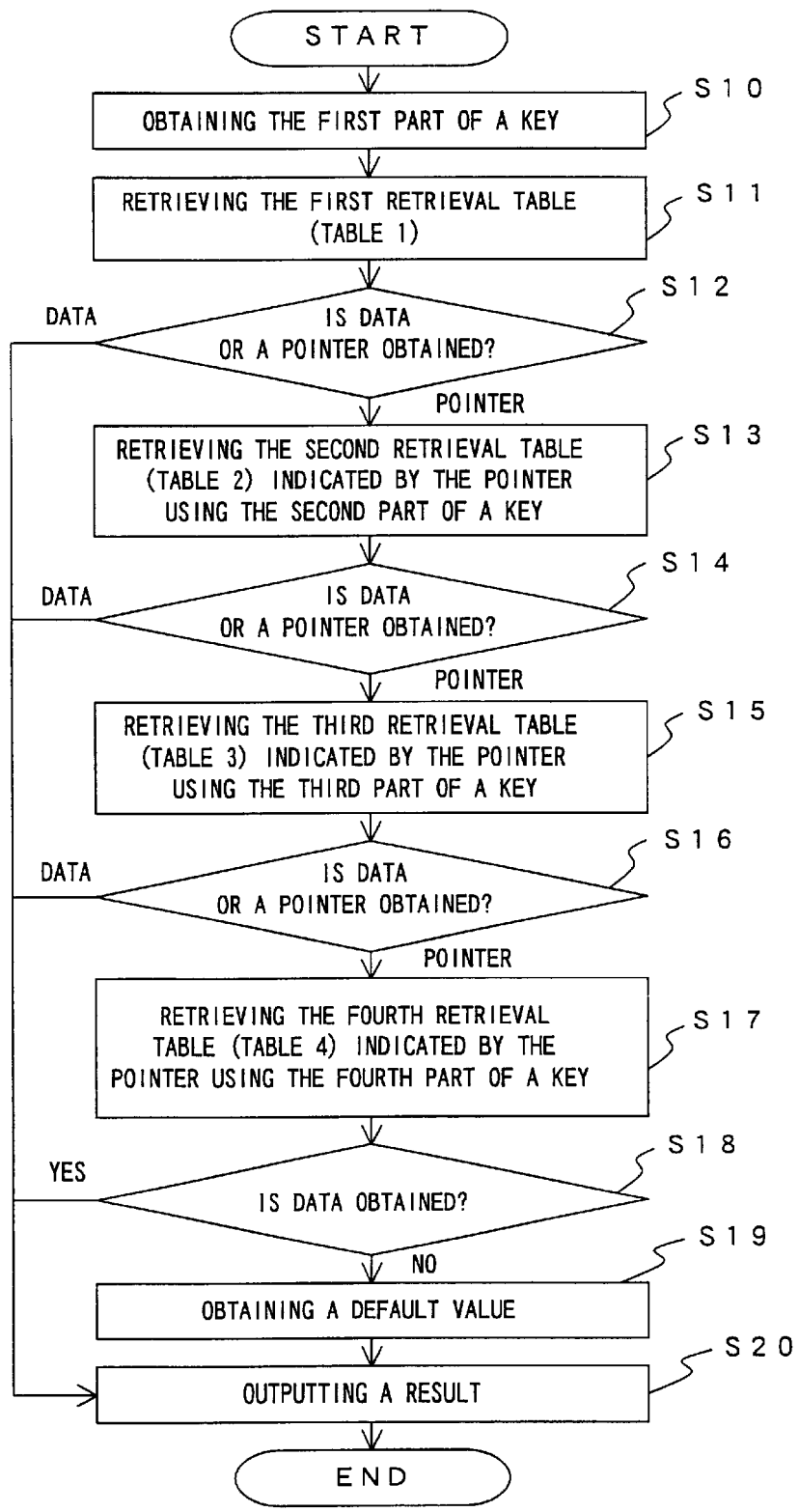
FIG. 8 is a flowchart showing a retrieval table retrieving process in the first embodiment.

FIG. 8 is a flowchart showing the retrieval process of a retrieval table of the first embodiment.

In the above-mentioned explanation, a retrieval key consists of 32 bits and is divided every 8 bits, and the first to fourth parts of the thus-divided retrieval keys are used for a retrieval process.

As one concrete example, a retrieval procedure is shown using a key of "1.0.2.255" as shown in FIG. 7.

First, the first part of the key is obtained in step S10. In this case, the first part is "1". Next, in step S11, the first retrieval table (table 1) is retrieved by the first part "1" of the key. In step S12, it is determined whether the acquired data is data or a pointer. In the case of data, a process advances to step 20. In the case of a pointer, a process advances to step S13.

In the case of FIG. 7, the acquired data is a pointer, and a table 2 is obtained. Next, the second retrieval table (table 2) is retrieved by the second part "0" of the key (step S13). In step S14, it is determined whether the acquired data is data or a pointer after the table 2 is retrieved. In the case of data, a process advances to step 20. In the case of a pointer, the third retrieval table (table 3) is obtained.

Similarly, the third retrieval table (table 3) is retrieved by the third part "2" of the key (step S15) In step S16, it is determined whether the acquired data is data or a pointer. In the case of data, a process advances to step 20. In the case of a pointer, the fourth retrieval table (table 5) is obtained. In step S17, the table is retrieved by the fourth part "255" of the key. In step S18, it is determined whether data is obtained. In the case that data is obtained, a process advances to step S20. In the case that data is not obtained, a default value is obtained in step S19, and a process advances to step S20. In step S20, a final retrieval result (data) is output.

In the case of the above-mentioned example, a retrieval process is performed using all the divided keys. However, a result can be obtained with fewer table retrieval steps, depending on the entry contents of the table. For example, when the table is retrieved with a key of "1.1.3.5", a result of the retrieval (data) can be obtained when the table 2 is retrieved by the second part "1" of the key as shown in FIG. 7. Therefore, the retrieval process terminates.

According to the first embodiment, the retrieval process performed by dividing a key of 4 bytes every 1 byte terminates after accessing the table of 256 entries only four times. Since such a table can be realized by using a generally-used random access memory, the retrieval of the IPv4 address of 4 bytes terminates by accessing the memory four times at most. When a memory with an access cycle time of 50 ns is used, a retrieval time becomes approximately 200 ns. A performance rate of five million accesses/second can be realized.

The present embodiments seem to be inferior to a conventional technology if only this numerical value is taken into consideration. The present embodiments, however, can shorten the general process delay since there is the possibility that a result can be obtained without making retrieves up to the last field when a path table is retrieved, and that a transmission time and retrieval time can be overlapped since it is able to start a retrieval process without waiting for the arrival of all the pieces of retrieval data, in the case that data is given in an octet unit, as in network communication.

The above-mentioned embodiment is characterized by that fact that the size of a table can be made small. The details will be explained later, but an area that is not used such as the one in the first retrieval table of the Tiny Tera method can be deleted, by dividing a key into smaller parts or into parts with irregular sizes. Fundamentally, in the case that a table with the same contents is used at a plurality of places, the table can be repeatedly used.

Figure 9:
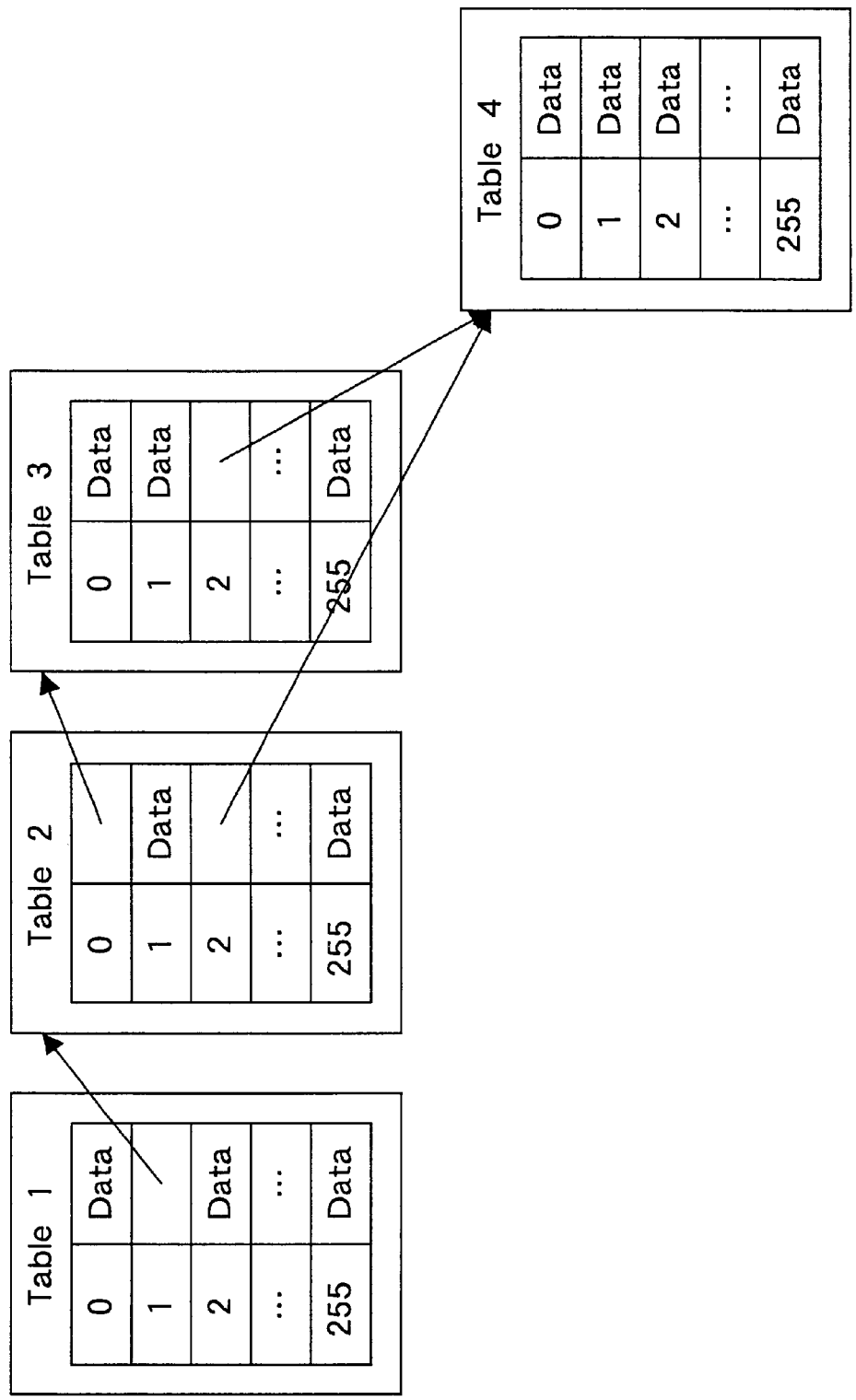
FIG. 9 shows tables indicating the concept in the case that one table is used repeatedly.

FIG. 9 shows tables indicating the concept in the case that one table is repeatedly used.

In the case of FIG. 7, when the table 2 is retrieved using the second part of the key, the table 3 is indicated in the case that the second part is "0", while the table 4 is indicated in the case that the second part is "2". Further, the retrieval result of table 3 indicates the table 5. Accordingly, a table that obtains the final result is the table 4 or the table 5 depending on a retrieval key. However, in the case that the entry of the table 4 is the same as that of the table 5, it becomes an ineffective use of memory capacity to separately provide two tables, each of which has the same entry. In this case, as shown in FIG. 9, the table 4 can be physically shared by setting both the table indicated by a key "2" of the table 2 and the table indicated by a key "2" of the table 3, as the table 4. Thus, a memory capacity can be economized, so that a retrieval process can be realized with a small memory even if the number of bits of a retrieval key increases.

In the Tiny Tera method, a table is made large in order that a retrieval key is divided into two at most. In the present embodiments, however, by dividing a retrieval key into small pieces, the table can be made small, so that the table can be easily prepared and updated. In an extreme case, the table consists of two entries when a retrieval key is divided every one bit, and a maximum of thirty two memory accesses is required for the retrieval of the IPv4 address. At this time, the maximum retrieval time is eight times that of 8-bit division. However, a table entry that is not used can be removed.

Figure 10:
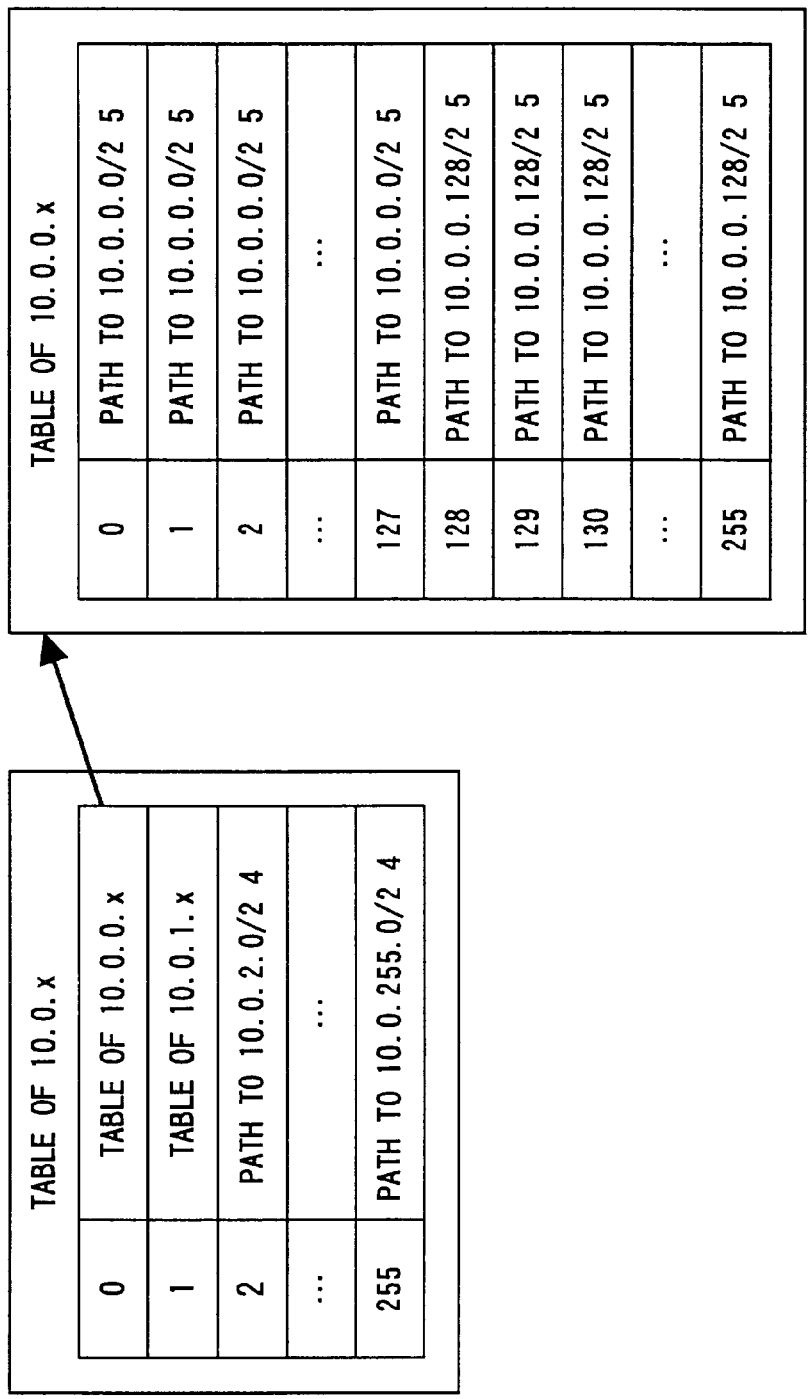
FIG. 10 shows tables explaining the problem of the first embodiment of the present invention.

FIG. 10 shows tables explaining the problem of the first embodiment of the present invention.

In the first embodiment, a table is made small by dividing a retrieval key into small pieces, but an area that is not used still exists even in the case that the retrieval key is divided, for example, every 8 bits. This will be explained assuming that the IPv4 address is divided every one byte to be processed.

In the example of FIG. 10, "10.0.x" (table of the third part) and "10.0.0.x" (table of the fourth part) are shown. In the table of "10.0.x", the 0th entry, for example, shows the table of "10.0.0.x". The second entry shows the path to "10.0.2.0/24". Since the length of a network unit of "10.0.2.0/24" agrees with the boundary where the key is divided for a retrieval process (twenty-fourth bit from the head of a retrieval key (destination address)), a table of "10.0.2.x" is not required.

On the other hand, "10.0.0.x" consists of two networks of "10.0.0.0/25" and "10.0.0.128/25", and it has paths to the two networks. Therefore, the table of "10.0.0.x" is required. In the table of "10.0.0.x", each of the 0th to the 127th entries stores the path to "10.0.0.0/25" (the most significant bit (the 25th bit from the head of a retrieval key) is "0" of four bits of the 4th part of the key) . Further, the 128th to 225th entries store paths to "10.0.0.128/25" (the most significant bit among the four bits of the 4th part of the retrieval key or the 25th bit from the head of a retrieval key (destination address) is "1").

As it is clear from these examples, the data of the same contents is required to be stored repeatedly in the table depending on the boundary where the retrieval key is divided and the actual contents of the table, even in the first embodiment. In this case, the path information of "10.0.0.0/25" that should be basically one entry, requires 128 entries, in other words, 128 times the area. If the path of "10.0.0.0/25" changes, exactly the same contents should be set in 128 entries from the $0^{th}$ entry to the 127th entry in the table of "10.0.0.x". Therefore, a process time for modifying path information becomes 128 times. In the case that the modification of path information occurs frequently, this becomes a big problem.

The reason why such a problem, with regard to the configuration of a table, occurs in the first embodiment is that the number of bits used for the retrieval of the table to be divided for the retrieval differs from a processing unit of the table required for the application (as for the routing of the Internet, the unit is represented by a unit bit number of the network unit of a destination address). For example, such a problem does not occur, if the control of a path is carried out every 8 bits. However, there is not such a rule that a network unit is used every 8 bits in the Internet protocol.

FIG. 11 shows tables explaining one method for solving the problem that is explained in FIG. 10.

In the first embodiment, one method for effectively modifying the contents of a table is to provide a table (path information table) that stores a final value, and to store the location information of the path information table in a retrieval table. If the data structure of such a table is adopted, one of the corresponding values of the path information table may be modified, in the case that the path is updated. In other words, the path information is not written into the tables of "10.0.x" nor "10.0.0.x", as shown in FIG. 11. Instead, the pointer or index that shows the entry where the required path information of the path information table is registered, is stored. In the example of FIG. 11, an index (path Index2) of the path information table is stored in the second entry of the table of "10.0.x". When the path information table is referred to using this index, the path information to "10.0.2.0/24" is obtained. Similarly, a path Index255 is stored in the 255th entry. When the path information table is referred to, the path information to "110.0.255.0/24" can be obtained.

In the table of "10.0.0.x", a path Index0 is stored in the 0th to 127th entries, and the index indicates the path information to "10.0.0.0/25" of the path information table. Similarly, a path Index1 is stored in the 128th to 255th entries, and the index indicates the path information to "10.0.0.128/25" of an accounting information table. Specifically, only one entry exists for one path in the path information table. Therefore, the path can be updated one time, so that the path information can be accurately updated at high speed.

Figure 12:
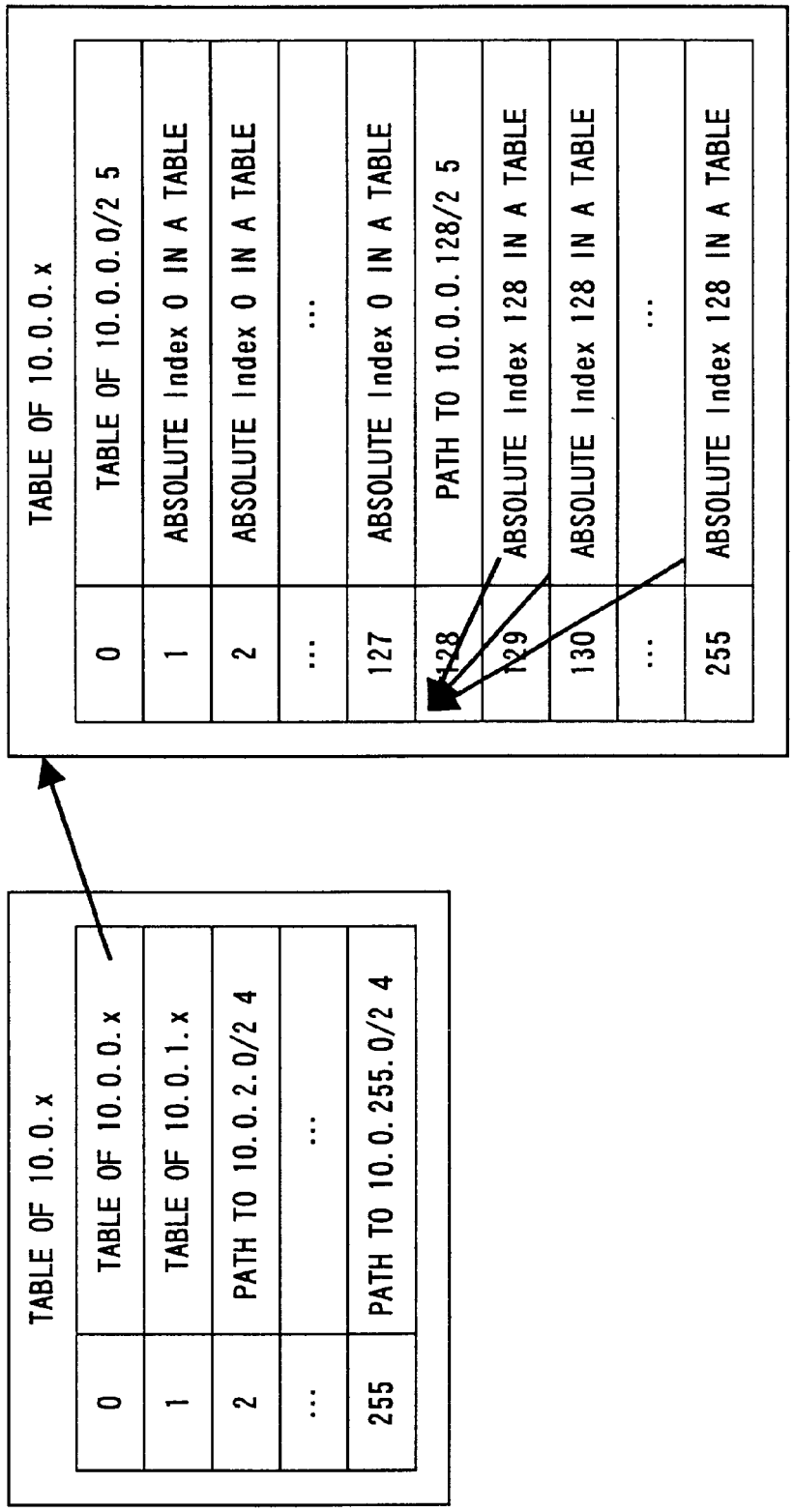
FIG. 12 shows tables explaining another method for solving the problem that is explained in FIG. 10.

FIG. 12 shows tables explaining another method for solving problems explained in FIG. 10.

In the method of FIG. 12, a value is set to one of the table entries with the same value, and a pointer and the like showing the location of the thus value-set entry are set to the other entries.

In the retrieval of "10.0.0.128", a retrieval process terminates since a path to "10.0.0.128/25" is obtained in the retrieval of the table of "10.0.0.x". In the retrieval of "10.0.0.129", since an "absolute index 128 in table" is obtained, the 128th entry of the table of "10.0.0.x" is referred to once again, and a value is obtained. In comparison with the method of FIG. 11, the method of FIG. 12 has such an advantage that a table equivalent to the "path information table" is not required, and the number of excess memory accesses does not occur when "10.0.0.128" is retrieved. Since the "absolute index in table" can designate the entry in an optional table, the index can accordingly designate the entry in another table.

FIG. 13 shows tables explaining another method for solving problems explained in FIG. 10.

The reason why FIG. 13 is conceivable as the variant of the method "absolute index in table" of FIG. 12 is that a "relative index in table" which is effective only within a table is used instead of the "absolute index in table". In the case of a relative index, the designated entry is limited to that in the same table.

For example, a relative Index-1 in the table is stored in the first entry of the table of "10.0.0.x". This indicates an entry of which the number is one smaller than that of the self entry. Accordingly, the index in the table of the first entry shows the 0-th entry. Similarly, the index in the table of the second entry shows an entry two larger than the self entry, and accordingly it shows the 0th entry. Also, the 127th entry indicates an entry 127 larger than the self entry, and accordingly it indicates the 0th entry.

Similarly, all the relative indexes in the table from the 129th to 255th entries show the 128-th entry.

FIG. 14 shows tables indicating another configuration example of the data structure of the table in the embodiments of the present invention.

In the table that is used in the embodiment of FIG. 6, a retrieval key is divided each 8 bits of a predetermined length, and a table is prepared for each divided key. By varying the division length, a more effective method can be obtained. In this method, a field that shows the size of the next index to be referred to is provided in the table, and the index value to be used is determined by the retrieval data in accordance with the value of this field. For example, as for the table of "10.0.0.x", there are only two entries of "10.0.0.0/25" and "10.0.0.128/25". Therefore, the index value is "1". In the case that the table entry includes final data, the index value is 0. In other words, in this case, the table of "10.0.0.x" does not set four bits from the 25th bit to 32nd bit, as a retrieval key, but instead it sets the 25th bit as a retrieval key. In this case, when the value of "x" of the retrieval key "10.0.0.x" is any number between 0 and 127, the 25th bit is "0". In the case that the value of "x" is any number between 128 and 255, 25th bit is "1". Therefore, in the case that only the 25th bit is made to be a key, only two entries are sufficient for the table entry.

Figure 15:
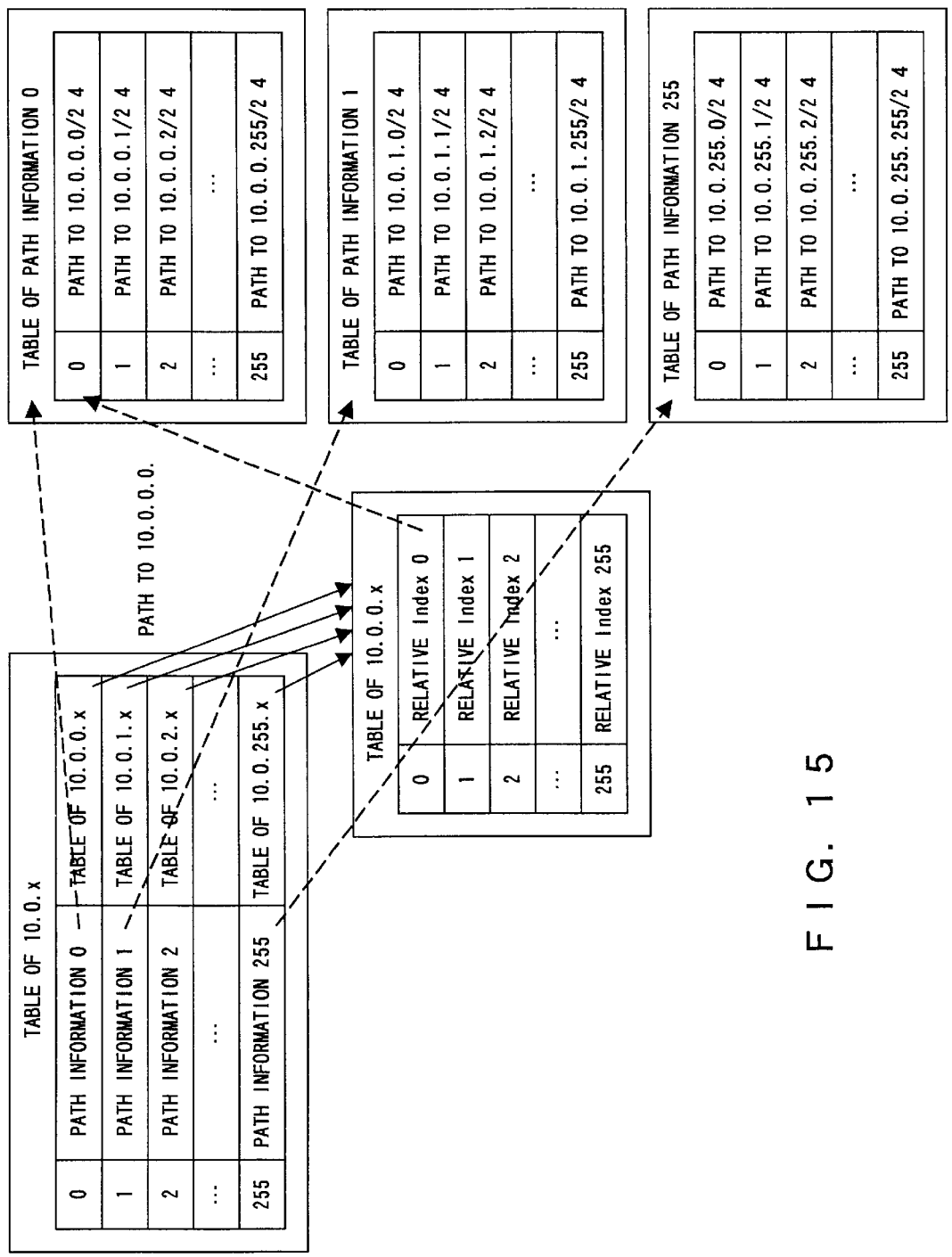
FIG. 15 shows tables indicating still another configuration example of the data structure of the table in the embodiment of the present invention.

FIG. 15 shows tables indicating another data configuration example of the table in the embodiments of the present invention.

With the Internet, the network can be freely used. However, the configuration of the controlled network is generally systematic. For example, there is the possibility that the usage of the network of "10.1.0.0/16" is exactly the same as that of the subordinately positioned network of the network of "10.0.0.0/16". In this case, a plurality of path index tables are provided, and one of them can be designated when a path index table is determined. Then, the subsequent retrieval tables are configured only using the relative location (relative index) and the table pointer of this path index table. Thus, all the subordinately positioned networks can be represented by a general table, so that the memory area used for the table can be reduced.

In the examples of FIG. 15, the tables to be used next are "10.0.0.x", "10.0.1.x", "10.0.2.x", and "10.0.255" in the 0th to 255th entries of the table of "10.0.x". In the case that the configurations of the subordinately positioned networks that are shown with these addresses are common (final path information may differ, but the method of connection of networks should be common), the required path information can be obtained by retrieving the same table. In other words, in the case of FIG. 15, any of the 0th to 255th entries shows the table of "10.0.0.x", and further indicates a path information table to be used. In each entry of the table of "10.0.0.x", a relative index showing which entry of the path information table should be referred to, is shown. Since path information 0 is shown in the 0th entry of the table of "10.0.x", the path information 0 table is referred to. Further, since the path to "10.0.0.0" is shown with a relative index 0 by referring to the table of "10.0.0.x", the path information to "10.0.0.0/24" can be obtained by referring to the 0th entry of the path information 0 table.

In the worst case of this example, it is thought that 256 path information tables are required. In actual path retrieval, however, the size of the path information table does not become larger than the actually-existing path. Therefore, a path information table can be substantially shared.

Furthermore, in the above embodiments of the present invention, the contents of tables can be made the same by using the above-mentioned various methods. As a result, the mutually linked tables with the same configuration can be physically realized using one table. In the example of the "path information table designation" of FIG. 15, 256 tables are shared with one table that is the "table of 10.0.0.x".

The tables and the mutual links between the tables of the above embodiments of the present invention are mathematically expressed by a rooted directed acyclic graph. The algorithm for searching a part graph with the same type as this graph is a well-known technology (article 12). However, the sharing of tables becomes possible by equalizing the contents of the tables with the various methods offered by the present embodiment.

In the embodiments of the present invention, a retrieval process always starts at the first table (root), and the retrieval is performed by tracing the pointer to the next table. On the other hand, the modification of a table occurs asynchronously with a retrieval process, so that the retrieval result becomes wrong in the case that the contents of the table are partly modified.

Figure 16:
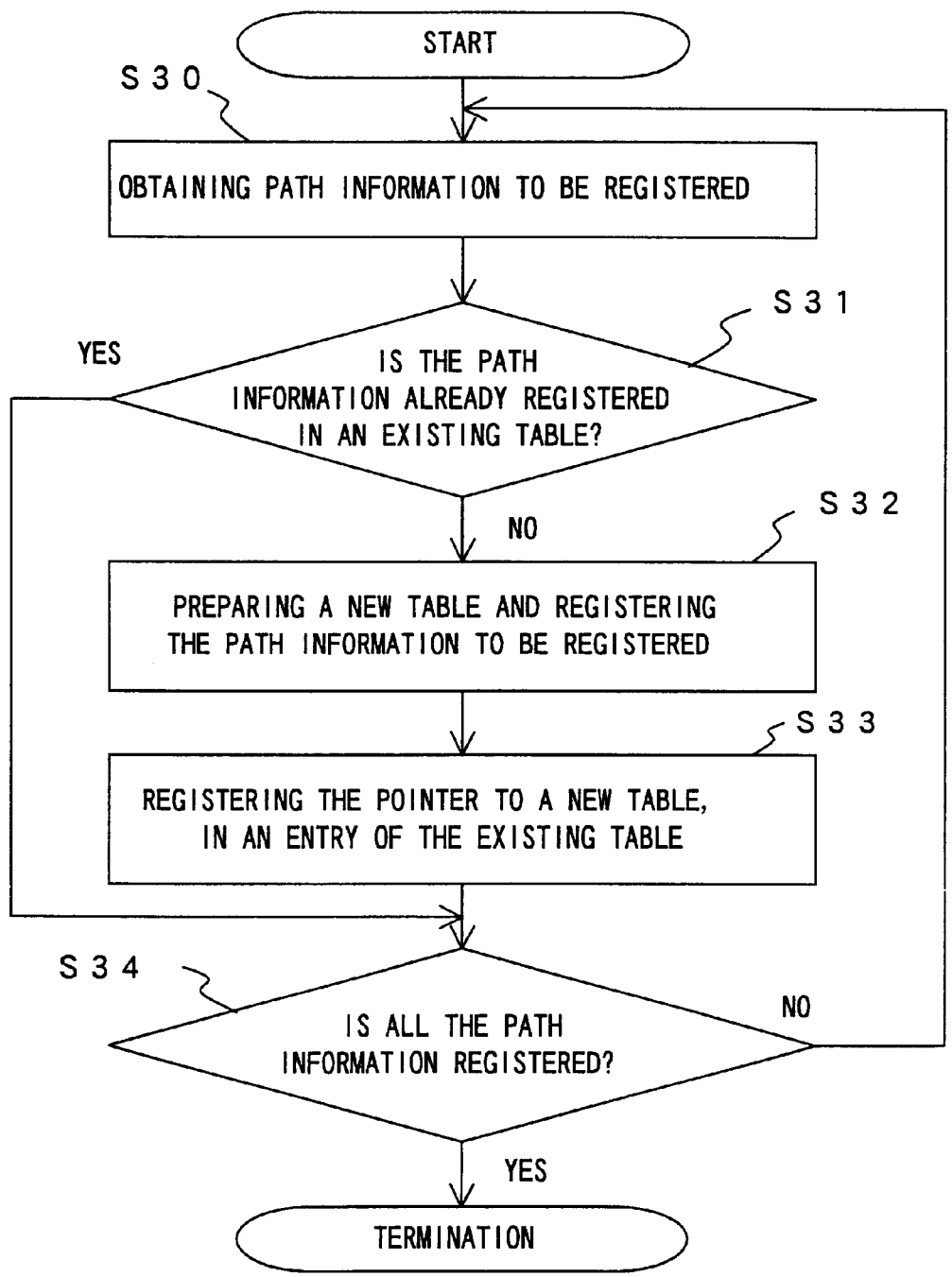
FIG. 16 is a flowchart showing a modification process of the table.

In order to solve such a problem, a table is modified with the following procedures:

FIG. 16 is a flowchart showing the modification process of a table.

The outline of the modification process of the table is as follows:

Prepare a new, table other than a table to be used for a retrieval process (or a mutual link with a plurality of tables); and Replace the pointer to the root of the new table with the pointer of the necessary part of the table that is being used for the retrieval process According to this method, since a huge table can be replaced with consistency by rewriting a pointer one time, this method has an advantage that the consistency regarding the modified part is not lost even if a retrieval process stops during the rewriting process of the pointer or if a pointer is rewritten while performing the retrieval process.

In step S30, the path information to be registered is obtained. Then, in step S31, the existing table is retrieved, and it is determined whether the path information to be registered is already registered. In the case that the judgment of step S31 is YES, processes terminate. In the case that the judgment of step S31 is NO, in step S32 a new table is prepared to register the path information to be registered, or a mutual link with a plurality of tables is prepared to register the path information to be registered. Next, in step S33, a pointer to reach the path information registered in the new table or the path information to be registered that is shown by the mutual link with the plurality of tables, is registered in a required table among the existing tables. In step S34, it is judged whether all the pieces of path information to be registered are already registered. In the case that there remains path information to be registered, a process returns to step S30 to repeat the processes. In the case that all the pieces of path information are registered, the processes terminate. Thus, the modification processes of a table terminate.

Furthermore, even in the case that a table for a path information retrieval is newly prepared, the table can be prepared by almost the same process except for only one difference that an existing table included in the above-mentioned process is not present.

FIG. 17 is a drawing explaining the second embodiment of the present invention.

In the embodiment of FIG. 6, the divided fields are sequentially retrieved from the front. However, it is possible to provide a root table for each divided field, and simultaneously perform retrievals of the respective divided fields. The result of a rear field is influenced by the retrieval result of a front field in a prefix match search. In the case that a table corresponding to the rear field can be shared, however, the retrieval result of the rear field can be modified according to the retrieval result of a table corresponding to the front field, by using the same concept as "path information table designation".

If the process is explained using the example of FIG. 15, since the table of "10.0.0.x" is commonly stored in the fourth retrieval key, the retrieval of a table "10.0.x" using the third retrieval key can be performed simultaneously with the retrieval of the table "10.0.0.x" using the fourth retrieval key. If a path information table 0 is selected by the retrieval of the third retrieval key and a relative Index0 is simultaneously acquired by the retrieval of the fourth retrieval key, it is understood that the 0th entry of the path information table 0 may be obtained by simultaneously performing retrievals by the third retrieval key and the fourth retrieval key. Thus, in the case that the table of a retrieval key of the rear field does not depend on the retrieval result of a retrieval key of the front field but the table can be shared by one table, like a table corresponding to the fourth retrieval key of FIG. 15, the retrieval using a retrieval key for retrieving the shared table can be performed simultaneously with the retrieval using a retrieval key of the front field. Accordingly, if all the tables corresponding to the second to fourth retrieval keys are shared in the case that a retrieval key is divided into four fields, the retrievals by the first to fourth keys can be simultaneously performed.

At this time, as shown in FIG. 17, the number of entries is $2^A$ in the first retrieval table corresponding to an A-bit key that is the first retrieval key. The number of entries is $2^b$ in the second retrieval table corresponding to a B-bit key that is the second retrieval key. The number of entries is $2^c$ in the third retrieval table corresponding to a C-bit key that is the third retrieval key. When the retrieval results of these retrieval tables are input to a synthesis circuit, path information is output as a final result from the path information table that is stored in the synthesis circuit.

According to this method, since a process of retrieving a table is performed only one time, irrespective of the number of fields, a retrieval time can be reduced in comparison with a sequential retrieval in the case that a retrieval process is performed using long retrieval data like the IPv6 address. A case that this method is effective is limited to the case that the table corresponding to the rear field is shared by one pattern. Otherwise, the result obtained by synthesizing the results becomes the same length as that of the retrieval data. This results in the requirement for the table for the entire retrieval data. In such a case, the sequential retrieval method is used.

FIG. 18 is a drawing showing one example of the hardware environment of an apparatus that is required when a retrieval process is implemented by a program using the table described in the embodiments of the present invention.

A CPU 21 is connected with a ROM 22 through a bus 20. In the ROM 22, fundamental programs such as BIOS and others are stored, thereby causing the CPU 21 to perform various kinds of input/output processes through the bus 20 at the start of actuating an apparatus. The program to realize the present embodiments is stored in the ROM 22 to cause the CPU 21 to perform processes.

The CPU 21 executes the program that is stored in a storage apparatus 27 consisting of a hard disk, etc., in the RAM 23, thereby executing the program. Otherwise, the program is stored in a portable recording medium 29 such as a CD-ROM, floppy disk, DVD, MO, etc., thereby causing the CPU 21 to execute the program while reading the program from a recording-medium reading apparatus 28. Further, it is also appropriate that the program that is stored in the portable recording medium 29 is installed in the storage apparatus 27, thereby causing the CPU 21 to execute the program.

An input/output apparatus 30 is used to input a command from a user to the CPU 21 or present the process result of the CPU21 to a user, and this apparatus includes a display, mouse, keyboard, etc.

A communication interface 24 communicates with an information provider 26 through a network 25. The information provider 26 owns the program, and downloads it, for example, into the storage apparatus 27 so that the CPU 21 can execute the program. It is also possible that the program can be performed in network environments, in the case that the network 25 is a LAN or the like.

The table of the present embodiments can be stored in the ROM 22, but it cannot be rewritten if it is stored in the ROM 22. Therefore, it is preferable to store the table in the RAM 23, but the table may also be stored in the database of the storage apparatus 27, portable recording medium 29, or information provider 26.

The above-mentioned embodiments of the present invention can be executed using a program. However, the logic, etc., of the retrieval process of a table may be configured by hardware such as FPGA, ASIC, or the like. In this case, it is expected that the process speed is faster than that attained by the program. In this way, the embodiments of the present invention can be executed either by software or hardware in accordance with the contents of the specification of an apparatus required by a person who uses the present invention. Therefore, the present invention is limited to neither software nor only hardware.

In the above-mentioned embodiments, the path table of the Internet is mainly explained. The method of the present embodiments can be applied to a general database retrieval process. With regard to the possibilities of other applications, a person having an ordinary skill in the art will easily understand the applied process.

The present invention can provide the data structure of a table with a small memory capacity, which can reduce entries that are not used and perform a high-speed retrieval process, a retrieval apparatus and retrieval method using the table.

Reference Documents

Retrieval method of performing a retrieval process setting as a table, the data structure (e.g. a tree) including key data, masks, etc.

1) IP address retrieval table preparation method, Toyoshima (NIPPON TELEGRAPH AND TELEPHONE CORP.), Japanese Patent Application No. Hei 9-262,535, filed Sep. 26, 1997

2) Longest matching retrieval method and apparatus, Mutou, et al. (NTT Communication wear Co., Ltd.), Japanese Patent Application No. Hei 8-338,666, filed Dec. 18, 1996

3) Routing table retrieval method, Nakamura, et al., (NIPPON TELEGRAPH AND TELEPHONE CORP.), Japanese Patent Application No. Hei 7-264,556, filed Oct. 12, 1995

4) Routing entry retrieval system and a retrieval method thereof, and the recording medium recording a control program, Yada (NIPPON Electrical Engineering Co., Ltd.), Japanese Patent Application No. Hei 10-190,859, filed Jul. 6, 1998

5) Routing table retrieval apparatus, Fujihara et al., (NIPPON TELEGRAPH AND TELEPHONE CORP.), Japanese Patent Application No. Hei 9-241,537, filed Sep. 5, 1997

6) Data retrieval circuit, Miyazaki et al, (NIPPON TELEGRAPH AND TELEPHONE CORP.), Japanese Patent Application No.Hei 9-41,441, filed on Feb. 12, 1997

Method using CAM (computer assisted manufacturing)

7) Router and the longest match retrieval apparatus, Murase et al., (NEC CORP.), Japanese Patent Application No. Hei 10-61,110, filed Mar. 12, 1998

8) Longest match retrieval apparatus, Yoneda et al. (Kawasaki Steel Co., Ltd.), Japanese Patent Application No. Hei 10-84,029, filed Mar. 30, 1998

Introduction of a comparatively new path retrieval method (including the Tiny Tera method)

9) Network Technology 11 of UNIX Magazine (Oct., 1998), Baguchi

10) Network Technology 12 of UNIX Magazine (Nov., 1998), Baguchi

What is claimed is:

1. A data structure for retrieval of data in a table based on a retrieval key, comprising:

at least three divided tables obtained by dividing the table to correspond to at least three retrieval key segments obtained by dividing the retrieval key, each divided table storing data that corresponds to one of the retrieval key segments, or a pointer or index for another divided table, where a final result is obtained by retrieving the data in one of the divided tables using a corresponding retrieval key segment and any preceding retrieval key segment.

2. The data structure of the table according to claim 1, wherein contents of each of the divided tables are unique.

3. The data structure of a table according to claim 1, wherein each divided table includes a result table storing a final result, and each divided table stores the pointer or index that shows an entry of the result table or another table.

4. The data structure of the table according to claim 3 wherein the pointer or index of each divided table shows a specific entry in the same divided table.

5. The data structure of the table according to claim 1, wherein each divided table stores a value that is pointed to by a registered pointer and indicates a size of another divided table, corresponding to the pointer.

6. The data structure of the table according to claim 1, wherein each divided table stores at least one of the result tables storing final results, and each divided table is provided with information designating at least one of the result tables and information showing an entry of the result table.

7. A table retrieval apparatus for obtaining a desired result from a table based on a retrieval key, comprising:

an input unit supplying at least three retrieval key segments obtained by dividing the retrieval key;

a divided table storage unit storing at least three divided tables, obtained by dividing the table to correspond to the retrieval key segments, each divided table storing one of data for the desired result and a pointer or index for another divided table; and a result obtaining unit obtaining the desired result by retrieving the data in one of the divided tables using a corresponding retrieval key segment and any preceding retrieval key segment.

8. The table retrieval apparatus according to claim 7, wherein contents of each of the divided tables are unique.

9. The table retrieval apparatus according to claim 7, wherein each divided table includes a result table storing a final result, and each divided table stores the pointer or index that shows an entry of the result table or another divided table.

10. The table retrieval apparatus according to claim 9, wherein the pointer or index of each divided table shows a specific entry in the same divided table.

11. The table retrieval apparatus according to claim 7, wherein each divided table stores a value that indicates a size of another divided table pointed to by a registered pointer, corresponding to the pointer.

12. The table retrieval apparatus according to claim 7, wherein each divided table stores at least one of the result tables storing final results, and each divided table is provided with information designating at least one of the result tables and information showing an entry of the result table.

13. The table retrieval apparatus according to claim 7, wherein retrievals of the divided tables corresponding to a plurality of retrieval key segments are simultaneously performed.

14. A table retrieval method for obtaining a desired result from a table based on a retrieval key, comprising:

supply at least three retrieval key segments obtained by dividing the retrieval key;

storing at least three divided tables obtained by dividing the table to correspond to the retrieval key segments, each divided table storing one of data for the desired result and a pointer or an index for another divided table; and obtaining the desired result by retrieving the data in one of the divided tables using a corresponding retrieval key segment and any preceding retrieval key segment.

15. The table retrieval method according to claim 14, wherein contents of each of the divided tables are unique.

16. The table retrieval method according to claim 14, wherein each divided table includes at least one of the result tables storing final results, and each divided table stores the pointer or index that shows an entry of the result table or another divided table.

17. The table retrieval method according to claim 16, wherein the pointer or index of each divided table shows a specific entry in the same divided table.

18. The table retrieval method according to claim 14, wherein each divided table stores a value that indicates a size of another divided table pointed to by a registered pointer, corresponding to the pointer.

19. The table retrieval method according to claim 14, wherein each divided table stores at least one of the result tables storing final results, and each divided table is provided with information designating at least one of the result tables and information showing an entry of the result table.

20. The table retrieval apparatus according to claim 14, wherein retrievals of the divided tables corresponding to the retrieval key segments are simultaneously performed.

21. A recording medium storing a program causing a computer to perform a table retrieval method, for obtaining a desired result from a table based on a retrieval key, the method comprising:

supplying at least three retrieval key segments obtained by dividing the retrieval key;

storing at least three divided tables obtained by dividing the table to correspond to the retrieval key segments, each divided table storing one of data for the desired result and a pointer or index for another divided table; and obtaining the desired result by retrieving the data in one of the divided tables using a corresponding retrieval key segment and any preceding retrieval key segment.

22. The recording medium according to claim 21, wherein contents of each of the divided tables are unique.

23. The recording medium according to claim 21, wherein each divided table includes at least one of the result tables storing final results, and each divided table stores the pointer or index that shows an entry of the result table or another divided table.

24. The recording medium according to claim 23, wherein the pointer or index of each divided table shows a specific entry in the same divided table.

25. The recording medium according to claim 21, wherein each divided table stores a value that indicates a size of another divided table pointed to by a registered pointer, corresponding to the pointer.

26. The recording medium according to claim 21, wherein each divided table stores information designating at least one of the final results and information showing an entry of the result table.

27. The recording medium according to claim 21, wherein retrievals of the divided tables corresponding to the retrieval key segments are simultaneously performed.

* * * * *

UNITED STATES PATENT AND TRADEMARK OFFICE
CERTIFICATE OF CORRECTION

PATENT NO. : 6,839,703 B2
DATED : January 4, 2005
INVENTOR(S) : Akira Jinzaki

It is certified that error appears in the above-identified patent and that said Letters Patent is hereby corrected as shown below:

Column 15,
Line 38, "supply" should be -- supplying --.

Signed and Sealed this

Sixth Day of September, 2005

JON W. DUDAS
*Director of the United States Patent and Trademark Office*